United States Patent
Ai

(10) Patent No.: US 10,721,347 B2
(45) Date of Patent: Jul. 21, 2020

(54) DETECTING PATTERNS AND BEHAVIOR TO PREVENT A MOBILE TERMINAL DROP EVENT

(71) Applicant: Futurewei Technologies, Inc., Plano, TX (US)

(72) Inventor: Jiang Ai, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/907,606

(22) Filed: Feb. 28, 2018

(65) Prior Publication Data
US 2019/0268461 A1    Aug. 29, 2019

(51) Int. Cl.
*H04M 1/725*    (2006.01)
(52) U.S. Cl.
CPC .... *H04M 1/72569* (2013.01); *H04M 2250/12* (2013.01)
(58) Field of Classification Search
CPC .............................. G06F 3/016; G06F 2203/00
See application file for complete search history.

(56) References Cited

U.S. PATENT DOCUMENTS

2015/0324698 A1* 11/2015 Karaoguz ............ H04L 67/22
                                                                706/46
2016/0342208 A1* 11/2016 Levesque .............. G06F 3/016

FOREIGN PATENT DOCUMENTS

| CN | 104980588 A | 10/2015 |
|---|---|---|
| CN | 105141779 A | 12/2015 |
| CN | 106331253 A | 1/2017 |
| CN | 107483693 A | 12/2017 |
| CN | 201810051094 | * 1/2018 |
| CN | 108055414 A | 5/2018 |
| CN | 108307063 A | 7/2018 |

OTHER PUBLICATIONS

Rabiner, Lawrence R., "A Tutorial on Hidden Markov Models and Selected Applications in Speech Recognition," Proceedings of the IEEE, vol. 77, No. 2, Feb. 1999, 30 pages.
International Search Report dated May 20, 2019, in PCT Patent Application No. PCT/CN20191075513, 10 pages.

* cited by examiner

*Primary Examiner* — Joshua L Schwartz
(74) *Attorney, Agent, or Firm* — Vierra Magen Marcus LLP

(57) ABSTRACT

The disclosure relates to technology for preventing a drop event for a mobile device. Sensor data is collected from the mobile device using one or more sensors to determine a pattern and/or current behavior of a user. A potential drop event risk of the mobile device is then determined based on the pattern and/or the current behavior of the user, and a notification is sent to the user of the mobile device indicating the potential drop risk when the pattern and/or the current behavior of the user is determined to satisfy a threshold risk level.

20 Claims, 9 Drawing Sheets

DETECTING PATTERNS AND BEHAVIOR TO PREVENT A MOBILE TERMINAL DROP EVENT

FIELD

The disclosure generally relates detecting use patterns and user behavior to prevent a mobile terminal drop event.

BACKGROUND

Sophisticated electronic devices are becoming more and more commonplace. These electronic devices include computing devices such as notebook/portable computers and personal digital assistants (PDAs), communication devices such as wireless telephones, mobile phones, and media devices such as CD, DVD and MP3 players. These and other electronic devices commonly include a variety of sensitive components. One issue with these electronic devices is their ability to withstand physical impacts to the system. One common source of impacts are fails, either inadvertent or intentional. Portable devices are commonly carried, and thus are commonly dropped. The force of the resulting impact can damage sensitive portions of the device.

BRIEF SUMMARY

According to one aspect of the present disclosure, there is provided a method of preventing a drop event for a mobile device, comprising collecting sensor data from the mobile device using one or more sensors to determine at least one of a pattern and current behavior of a user; determining a potential drop event risk of the mobile device based on at least one of the pattern and the current behavior of the user; and sending a notification to the user of the mobile device indicating the potential drop risk when at least one of the pattern and the current behavior of the user is determined to satisfy a threshold risk level.

Optionally, in any of the preceding aspects, the method further comprises characterizing the sensor data from each of the one or more sensors to determine a level of risk of the drop event; aggregating the sensor data to construct a behavior drop event risk model using machine learning; and comparing at least one of the pattern and current behavior of the user to the behavior drop event risk model to determine the potential drop event risk.

Optionally, in any of the preceding aspects, the method further comprises identifying user patterns to generate the behavior drop event risk model, the patterns generated by collecting the sensor data during the drop event of the user; collecting the sensor data when detecting the potential drop event risk prior to occurrence of the drop event; and correlating the sensor data when a drop event occurs with the sensor data of the potential drop event risk.

Optionally, in any of the preceding aspects, the method further comprises constructing a user-specific behavior profile based on the user patterns.

Optionally, in any of the preceding aspects, the pattern is a grip pattern and the constructing further comprises determining the pattern of the user on the mobile device; determining a stability of the pattern on the mobile device; and identifying the potential drop event risk for each pattern.

Optionally, in any of the preceding aspects, the method further comprises identifying additional objects in the user grip; and combining the pattern of the user on the mobile device with the user grip of the additional objects to identify an overall risk of the drop event.

Optionally, in any of the preceding aspects, the method further comprising, in response to the notification preventing the drop event, sending positive feedback to the user to encourage learned behavior to prevent future drop events.

Optionally, in any of the preceding aspects, determining the potential drop event risk comprises analysis of at least one of a placement pattern, user hand grip area, user hand grip force, phone shake and user grip center to center of gravity of the mobile device.

Optionally, in any of the preceding aspects, sending the notification includes at least one of a visual notification, an auditory notification and a vibration notification.

According to one aspect of the present disclosure, there is provided a mobile device for preventing a drop event, comprising a non-transitory memory storage storing instructions; one or more sensors collecting sensor data from the mobile device to determine at least one of a pattern and current behavior of a user; one or more processors in communication with the memory, the one or more processors executing the instructions to determine a potential drop event risk of the mobile device based on at least one of the pattern and the current behavior of the user; and a notifier receiving a notification to the user of the mobile device indicating the potential drop risk when at least one of the pattern and the current behavior of the user is determined to satisfy a threshold risk level.

According to one other aspect of the present disclosure, there is provided A non-transitory computer-readable medium storing computer instructions for preventing a drop event for a mobile device, that when executed by one or more processors, cause the one or more processors to perform the steps of collecting sensor data from the mobile device using one or more sensors to determine at least one of a pattern and current behavior of a user; determining a potential drop event risk of the mobile device based on at least one of the pattern and the current behavior of the user; and sending a notification to the user of the mobile device indicating the potential drop risk when at least one of the pattern and the current behavior of the user is determined to satisfy a threshold risk level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for detecting use and behavior patterns to prevent a mobile terminal from being dropped by a user.

A user's grip, placement and behavior patterns are collected and recorded from sensors located in a mobile terminal. The data collected from the sensors is then used to train one or more behavior (or drop) models using various machine learning techniques. Current ("live") user grip, placement and/or behavior patterns sensed from a variety of sensors in the mobile terminal (and/or sensors in the surrounding environment) may then be used for comparison to the drop models. When the current user grip, placement and/or behavior patterns match one or more of the drop models, a notification is sent to the user of the mobile terminal indicating that a drop event is likely to occur based on the current grip, placement and/or behavior patterns. When a drop is prevented as a result of the notification, the user may develop better habits and learn to avoid future drop events.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
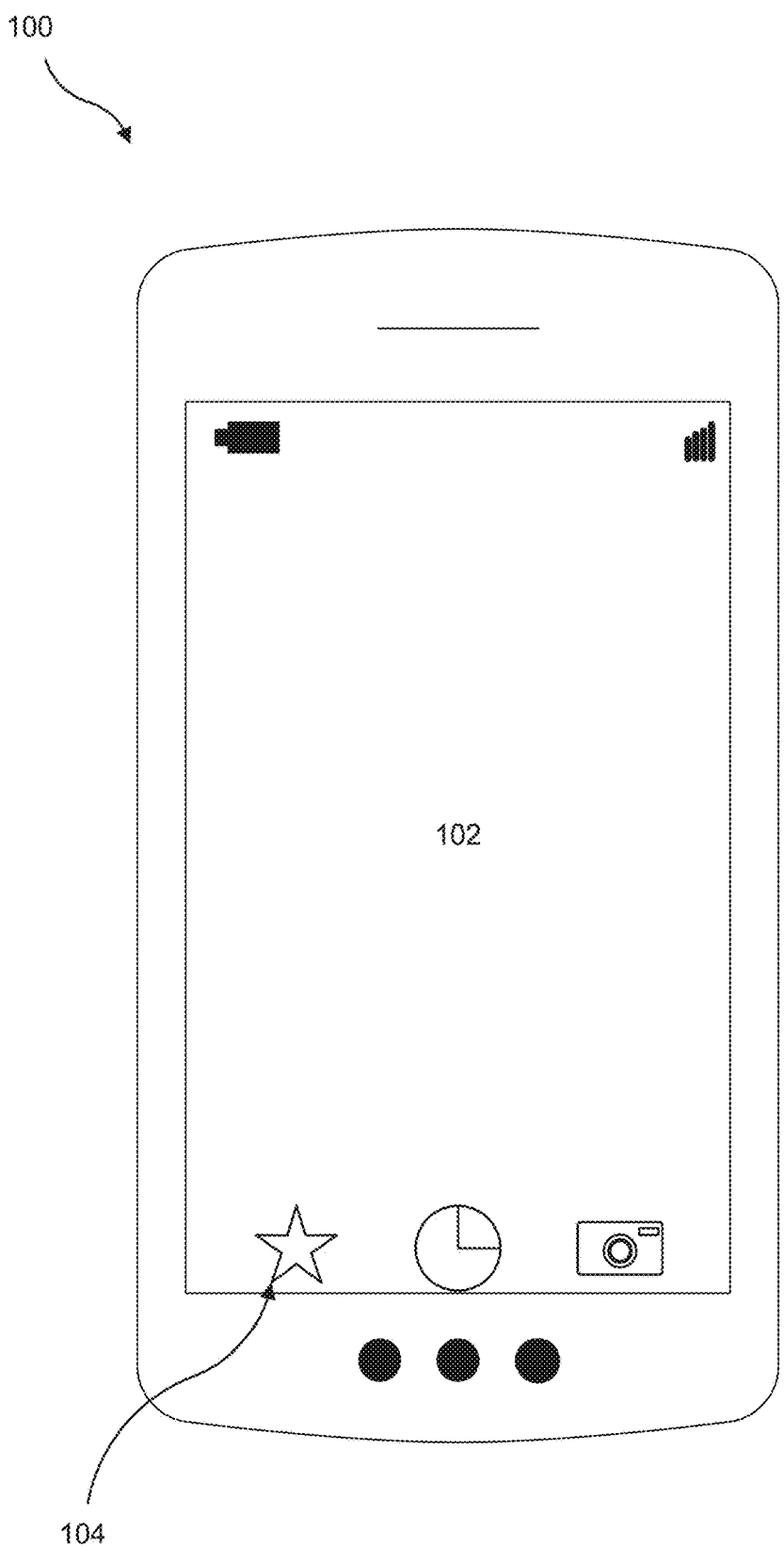
FIG. 1 illustrates an example mobile terminal according to an embodiment of the present disclosure.

FIG. 1 illustrates an example mobile terminal according to an embodiment of the present disclosure. The mobile terminal 100 (or mobile device) may be a data processing device, for example, a tablet, a personal digital assistant, a cellular phone, a network appliance, a camera, a smart phone, an enhanced general packet radio service (EGPRS) mobile phone, a network base station, a media player, a GPS device, an email device, a game control center, an electronic frame, and a data card, or any two or multiple of these data processing devices or of other data processing devices.

The mobile terminal 100 includes a display 102. The display 102 may be preferably a touch-sensitive display, for example, a liquid crystal display (LCD), a light emitting diode (LED) display, a carbon nanotube display, or other displays. The display 102 may be a device that is sensitive to user's touch and/or contact and integrates displaying and touch responding. The display 102 may include a multipoint touch-sensitive response function, where the multipoint touch-sensitive response refers to that the display 102 may simultaneously process multiple touch points, including processing data related to the pressure, area and/or position of each touch point. Such a multipoint touch function facilitates interaction between gestures or actions of multiple fingers and the mobile terminal 100.

The mobile terminal 100 may also display one or multiple graphical user interfaces on the display 102. The graphical user interface may include one or multiple selectable objects, that is, display objects 104. A display object 104 provides, by using a graphical icon, an input to initiate a function for the user. A selectable object includes, for example, a device function, an application, a window, a file, an alarm, an event, or other identifiable system objects.

In one embodiment, the mobile terminal 100 may implement functions of multiple devices, for example, a phone device, an email device, a network data communication device, a WiFi base station device, and a media processing device. In one embodiment, a specific display object may be displayed on a menu of a user interface. When a display object is selected by a user of the mobile terminal 100, the function associated with the display object is executed. For example, in response to user's touch on a phone object, the graphical user interface of the display 102 may present additional display objects 104 related to various phone functions, such as display objects representing voicemail. Similarly, touching an email object may enable the graphical user interface to present display objects 104 related to various email functions, touching a network object may enable the graphical user interface to present display objects 104 related to a Web browsing function, and touching a media player object may enable the graphical user interface to present display objects 104 related to various media processing functions, such as a camera (represented by a camera icon) or media viewer.

The mobile terminal 100 may also include sensors, in addition to the touch sensitive display, that enables users to interact with the device. For example, lateral sides of the mobile terminal 100 may include touch sensitive or pressure sensitive sensors that capture user handling of the device, cameras (forward facing and rear) may provide the device with the ability to monitor and detect various hand gestures or movements, fingerprint sensors may detect a user accessing the device, etc. As will become apparent from the discussion below, any number of different sensors and mechanisms may be built into the mobile terminal 100 to assist in detecting and sensing user actions.

Figure 2:
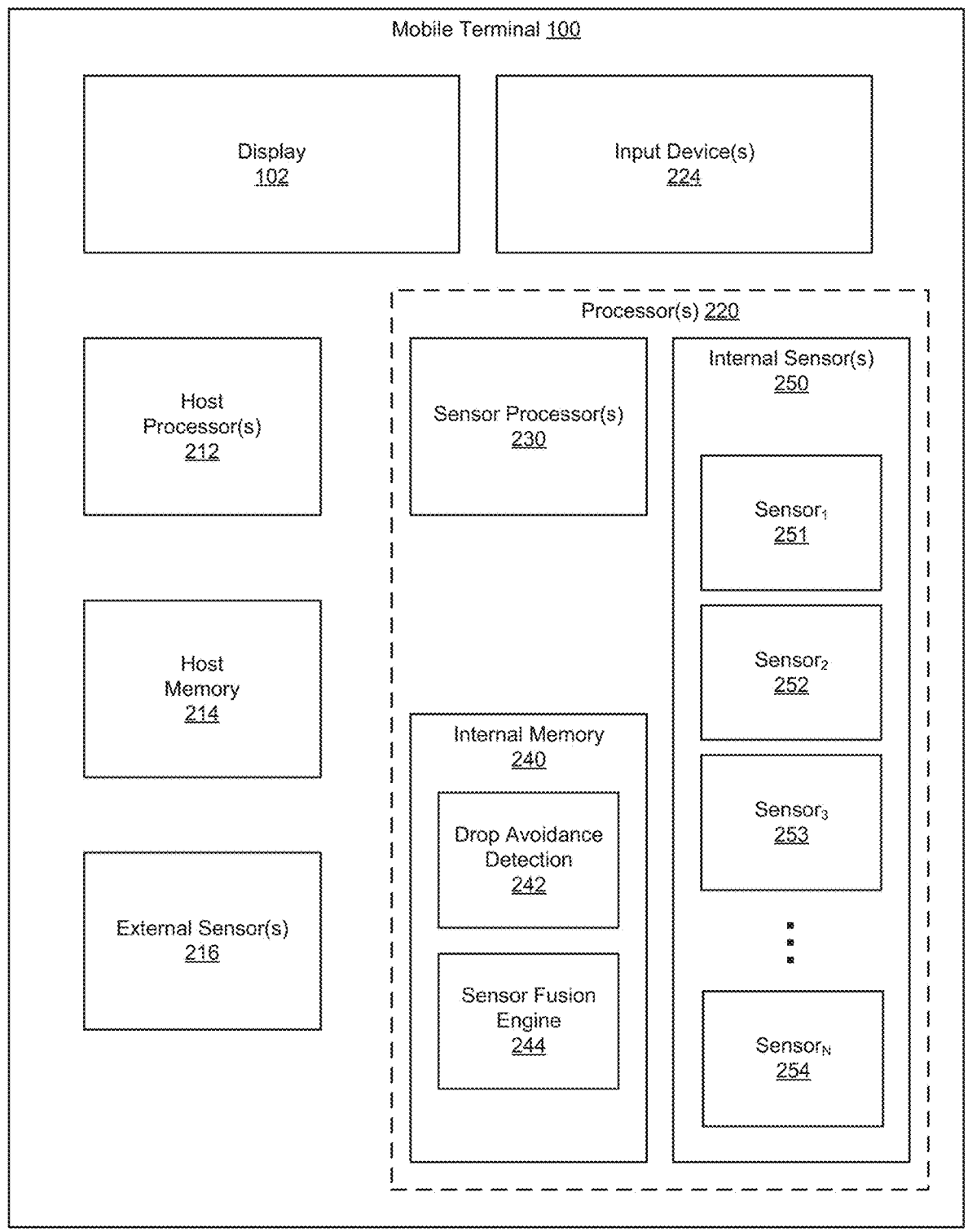
FIG. 2 illustrates a block diagram of the mobile terminal of FIG. 1, including a drop avoidance detection mechanism.

FIG. 2 illustrates a block diagram of the mobile terminal of FIG. 1, including a drop avoidance detection mechanism. As will be appreciated, the mobile terminal 100 may be implemented as a device or apparatus, such as a handheld and/or wearable device. For example, such a handheld device may be a mobile phone (e.g., a cellular phone, a phone running on a local network, a phone running in the cloud, or any other telephone handset), or any of the devices noted above.

In one embodiment, the mobile terminal 100 may be a self-contained device that comprises its own notifier, such as the display 102 or a speaker (not shown), and/or other output devices in addition to input devices 224 (e.g., keypad), as described below. However, in other embodiments, the mobile terminal 100 may function in combination with another portable device or a non-portable device such as a desktop computer, electronic tabletop device, server computer, etc., which can communicate with the mobile terminal 100, e.g., via network connections. The device may, for example, be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

As shown, the example mobile terminal 100 comprises a processor(s) 220, host processor 212, host memory 214, and may comprise one or more sensors, such as external sensor(s) 216. The host processor 212 maybe configured to perform the various computations and operations involved with the general function of the mobile terminal 100. For example, the host processor(s) 212 may be coupled to processor(s) 220 through a communication interface (not shown), which may be any suitable bus or interface. In one embodiment, the host memory 214 may comprise programs, drivers or other data that utilize information provided by the processor(s) 220.

In the disclosed embodiments, the processor(s) 220 is shown to include a sensor processor(s) 230, internal memory 240 and one or more internal sensors 250. The internal sensors 250, such as sensor$_1$ 251-sensor$_N$ 254, may include any variety of sensors. For example, sensors may include, but are not limited to, capacitive proximity sensors, a light proximity sensor, an accelerometer, a magnetometer and a gyroscope. In one embodiment, a processor can be coupled to any one or more of the sensors via any electronic communication medium, including a data bus, a serial data link, or other electric circuit.

Proximity sensors, such as a capacitive proximity sensor, utilize capacitive sensing to detect anything conductive or having dielectric properties different from air. In certain embodiments, capacitive proximity sensors are located on the top, bottom left and right sides of the mobile terminal 100. In this respect, the capacitive proximity sensors detect present capacitance on opposing sides of the mobile terminal. The detected capacitance is indicative, for example, of whether and how a user handles or grips the mobile terminal 100. The detection of capacitance at various locations of the mobile terminal 100 may indicate whether and how the mobile terminal 100 is being held. The mobile terminal 100 may be held for example in a left or right hand (FIG. 6B), held in both left and right hands (FIGS. 6C and 6D), and may also be distinguished by fingers, palm and thumb. In another embodiment, the capacitive touch screen can be collectively used to detect the proximity of the human body or other nearby objects, or used to detect the orientation of the mobile terminal 100 or the hand grip the user.

A light proximity sensor is another type of sensor that may be coupled to the mobile terminal 100. The light proximity sensor emits (infrared) light and detects the reflected light, and derives distance information to the reflector object. The sensor is typically placed on the top front side of the mobile terminal 100 that would be nearest a user's head when in use. The sensor detects, for example, the proximity of the mobile terminal 100 to other objects, such as when the mobile terminal 100 is extended at a distance from the user (for example, when taking a selfie).

An accelerometer may also be in the mobile terminal 100 and is configured to detect acceleration of the mobile terminal 100 in at least one dimension. Orientation of the mobile terminal 100 can be measured according to the detected acceleration. A typical 3-axis accelerometer will provide tilt information and the acceleration of the mobile terminal 100.

A magnetometer may also be in the mobile terminal 100 and measures the magnetic field—either from the magnetization of a magnetic material like a ferromagnet, or the magnetic field at a particular location from earth's magnetic core. For example, a compass is a simple type of magnetometer, one that measures the direction of an ambient magnetic field. Magnetic field information could be used to calibrate the device orientation.

A Gyroscope is another type of sensor that may be in the mobile terminal 100 and may be used to measure the orientation and angular velocity of an object. For example, using a 3-axis gyroscope, the rate of rotation along the three axis may be determined.

In another example, GPS coordinates may be used to track the movement of mobile terminal 100, using GPS based sensors. Coordinates may be obtained using GPS, Assisted-GPS (A-GPS) or the like. The indoor/outdoor information, speed and location information from GPS sensor may be used to determine the likelihood that the mobile terminal 100 is in motion, such as in a vehicle, aboard a train or on a rollercoaster.

As desired, one or more of the internal sensors 250 may be configured to provide raw data output measured along three orthogonal axes or any equivalent structure. The internal memory 240 may store algorithms, routines or other instructions for processing data output by one or more of the internal sensors 250, including drop avoidance detection 242 and sensor fusion 244.

The drop avoidance detection 242 detects the potential risk level of a drop event and senses when a drop event is about to occur. The drop avoidance detection 242 uses one or more of sensors 251-254, such as accelerometers, gyroscopes, inertial sensors, motion sensors, cameras, and the like. In one embodiment, the drop avoidance detection 242 also detects when a drop event has occurred. Detection of a drop event may, for example, be used to update or modify behavior models (discussed below) that enable the predictive assessment of the potential risk level of a drop event and sensing when a drop is likely to occur. Similarly, detecting that a drop event was prevented may also be used to provide notifications and guidance to the user for prevention of future drop events and learned habit forming.

In one other example embodiment, the sensor 251-254 may include one or more cameras that capture image data that is analyzed by a processor(s) 220 to detect the occurrence of a potential drop event based on the proximity of the mobile terminal 100 to the to another object (e.g., the proximity to an object about to strike or collide with the mobile terminal), velocity of the mobile terminal 100, change in orientation of the mobile terminal 100 and the like.

In still another example embodiment, the sensor 251-254 may include accelerometers that measure acceleration which may be analyzed by processor(s) 220 to identify a potential drop event based on the acceleration or velocity of the mobile terminal 100.

In one other example embodiment, the sensors 251-254 may include a global positioning system (GPS) sensor that detects positioning and location of the mobile terminal 100 for analysis by the processor(s) to identify the potential risk of a drop event. As appreciated, the above embodiments are non-limiting examples.

Any number of different sensors may be employed to detect and identify potential risk for a drop event or a drop event itself.

The sensor fusion engine 244 performs the actual fusion of sensor measurements and manages the creation and execution so as to integrate sensory measurements and sensor data. Measurements made by the sensors 251-254 are sent to the fusion engine 244 in order to orchestrate the sensor measurements from the various sensors. The data fusion method implemented by the data fusion engine 244 utilizes, for example, at least one stochastic model. Data fusion is discussed in more detail below with reference to FIG. 4.

External sensor(s) 216 may comprise one or more sensors, such as accelerometers, gyroscopes, magnetometers, pressure sensors, microphones, proximity sensors, and ambient light sensors, biometric sensors, temperature sensors, and moisture sensors, among other sensors. Even though various embodiments may be described herein in the context of internal sensors implemented in the processor(s) 220, these techniques may be equally applied to a non-integrated sensor, such as an external sensor 216.

The host processor(s) 212 and/or sensor processor(s) 230 may be one or more microprocessors, central processing units (CPUs), microcontrollers or other processors, which run software programs for the mobile terminal 100 and/or for other applications related to the functionality of the mobile terminal 100. For example, different software application programs such as menu navigation software, games, camera function control, navigation software, and telephone, or a wide variety of other software and functional interfaces, can be provided.

In some embodiments, multiple different applications can be provided on a mobile terminal 100, and in other embodiments multiple applications can run simultaneously on the mobile terminal 100. Multiple layers of software can be provided on a computer readable medium such as electronic memory or other storage medium such as hard disk, optical disk, flash drive, etc., for use with host processor(s) 212 and sensor processor(s) 230. For example, an operating system layer can be provided for the mobile terminal 100 to control and manage system resources in real time, enable functions of application software and other layers, and interface application programs with other software and functions of the mobile terminal 100.

In other embodiments, one or more motion algorithm layers may provide motion algorithms for lower-level processing of raw sensor data provided from internal or external sensors. Further, a sensor device driver layer may provide a software interface to the hardware sensors of the mobile terminal 100. Some or all of these layers can be provided in the host memory 214 for access by the host processor 212, in internal memory 240 for access by the sensor processor(s) 230, or in any other suitable architecture (e.g., including distributed architectures).

Figure 3:
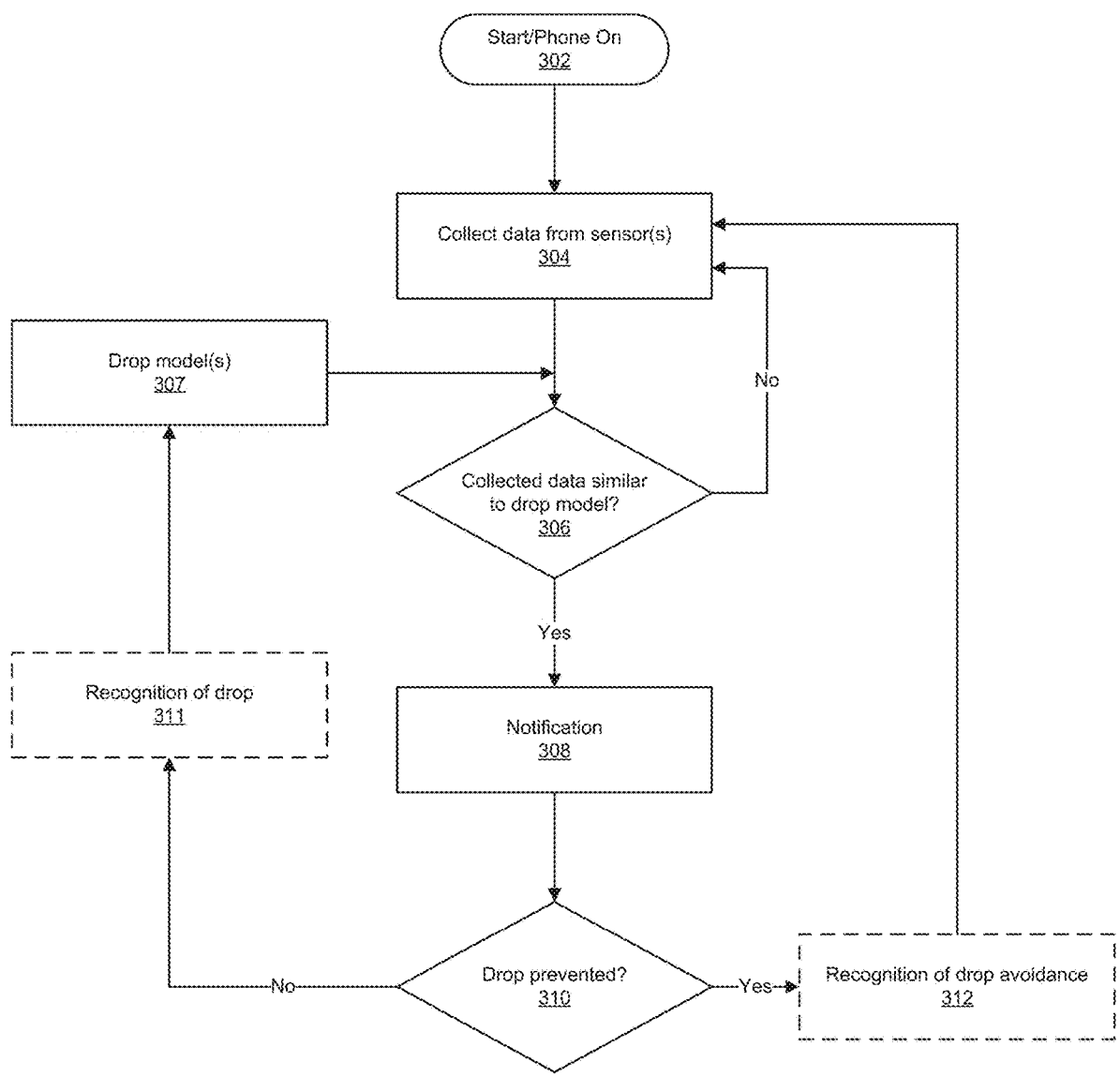
FIG. 3 illustrates a flow diagram of a drop event avoidance procedure in accordance with embodiments of the disclosure.

FIG. 3 illustrates a flow diagram of a drop event avoidance procedure in accordance with embodiments of the disclosure. For purposes of discussion, the procedures are implemented by the mobile terminal 100. However, it is appreciated that in other embodiments, sensors, processors, memory, drop detection and sensory fusion may also be performed at a location remote from the mobile terminal 100, such as in the cloud, in another mobile terminal or in another processing device.

At 302, a user of the mobile terminal 100 activates (i.e., turns ON) the device. At this stage, the mobile terminal 100 begins to collect data from one or more of the sensors 251-254.

As the mobile terminal 100 collects sensor data at 304, each of the various sensors 251-254 may be used to measure and store the sensor data. The sensor data (or measurement data) from one or more sensors 251-254 may be collected in memory, such as internal memory 240, for permanent or temporary storage, as well as to provide the measurement data to the sensor fusion engine 244 for aggregation of multi-sensor data.

Measurement data may be stored in memory since measurements obtained by one or more of the sensors 251-254 may be obtained at a rate different from one or more other sensors 251-254. For example, if measurement data from one sensor is dependent upon measurement data from another sensor, the memory provides a buffer in which to store the measurement data until all measurement data is ready for processing. In other embodiments, the measurement data may be processed by the fusion engine 244 without first being stored in memory. In one other embodiment, the measurement data stored in memory has been pre-processed, for example by processor(s) 220, and stored for further analysis. Such pre-processing may include any type of filtering, averaging, sub-sampling, outlier detection, and/or time stamping the data to associate an instance of time with one or more measurements.

In one embodiment, the measurement data stored in memory of the mobile terminal 100 may be offloaded for storage and/or processing, for example in the cloud, when the device has network connectivity. Measurement data recorded from external sensors 216 may likewise be stored and/or processed remote from the mobile terminal 100 and transmitted to the mobile device 100 when online. In one embodiment, the measurement data includes grip data of a user's hand gripping the mobile terminal 100. In this case, as explained above, sensors to detect grip may be installed in the left and right side surfaces, as well as the top and bottom surfaces of the mobile terminal 100. When the mobile terminal 100 is gripped with the user's hand, the grip sensors on the surfaces corresponding to user's hand grip of the mobile terminal 100 may output signals, whereby the mobile terminal 100 may recognize a user's grip state. For instance, when the mobile terminal 100 is gripped with the user's left hand, the palm may touch the left side surface of mobile terminal 100 and the fingers may touch the right side surface of the mobile terminal 100. In contrast, when the mobile terminal 100 is gripped with the user's right hand, the palm may touch the right side surface of the mobile terminal 100 and the fingers may touch the left side surface of the mobile terminal 100.

In one other embodiment, the measurement data includes user behavior data—e.g., detection of the user's environment, location, time surrounding, etc. For example, a user may be tracked to identify movement associated with travel to the office. During travel, the user may stop to buy a newspaper, get a cup of coffee and ride a subway. Each of these locations and movements can be tracked, along with corresponding measurement (movement) data generated by the mobile terminal 100. The data may then be used to evaluate a user's risk of dropping the mobile terminal 100, particularly in combination the user's hand grip, as described below in detail. Additionally, each of these activities generates distinct location, motion and temporal data that may be unique to the user, and therefore, be used to generate a user profile, explained below with reference to FIG. 5.

It is appreciated, however, that the internal sensors 250 and/or the external sensors 216 may be used to collect any type of a variety of different forms of data and that the measurement data is not limited to user grip and behavior data. For example, the placement of a mobile terminal 100 upon another object, such as a table, may be detected and the sensors may collect data about the placement upon the object. Moreover, while the disclosed embodiments discuss grip pattern and behavior data, it is appreciated that the mobile terminal 100 may use either the grip pattern or the behavior data (as opposed to a combination) to determiner drop events, as explained further below.

The collected data from the internal sensors 250 and/or external sensors 216 is then compared to a predefined drop model(s) to determine a potential drop event risk level of the mobile terminal 100 at 306. When the collected data from a mobile terminal 100 matches (or is similar to) a particular drop model 307, the procedure continues to 308 where a notification is sent to the user. If the collected data does not match (or is not similar to) a particular drop model 307, then the mobile terminal 100 continues to collect data from the internal sensors 250 and/or external sensors 216 at 304.

The drop model (or machine learning model) is a predictive model that receives an input and predicts an output based on the received input and on values of parameters of the drop model. In one embodiment, the drop model is predictive of the likelihood that a drop event (e.g., potential drop event risk or level) will occur based on a user's current grip pattern and behavior data collected from the internal sensors 250 and external sensors 216. Grip pattern and behavior data are explained in more detail below. In another embodiment, the drop model is predictive of the likelihood that a drop event will not occur based on the grip pattern and behavior data collected from the internal sensors 250 and external sensors 216.

The drop model is trained using training data as the input, such as data previously collected from internal sensors 250 and/or external sensors 216 of one or more mobile terminal users. As training data is collected, it may be stored in and retrieved from a data repository or any other type of storage.

The training data are examples for which a desired output, i.e., the output that should be generated by the model, is known or is estimated. Within the context of this disclosure, and for purposes of discussion, the training data could be user grip and behavior data that has been collected from internal sensors 250 and/or external sensors 216. In one embodiment, the training data may have been pre-processed to enhance and stabilize the data.

Prior to collection, the training data may be classified into one of pre-defined grip pattern classes for recognition. For example, any number of grip pattern classes for gripping the mobile terminal 100 may selected. Grip pattern classes, in which a specific grip pattern is associated with a particular application, may include, for example and without limitation, grip patterns when receiving a call, when composing a text message, when using the camera, when playing a video and when playing video games. Similarly, behavior data may be classified into one of pre-defined behavior patterns. For example, and without limitation, behavior pattern classes may include running, jumping on a bus, riding a rollercoaster, driving a car, hiking a mountain, playing sports and the like.

After the grip and behavior pattern classes are defined, and the training data is collected, the model may be trained using any different number of machine learning algorithms. As appreciated, as the amount of collected data increases (e.g., data is collected by more mobile terminals), the more accurate the grip and behavior training data will become. As the training data becomes more accurate, the resulting drop model likewise becomes more accurate. The collected data is then used to train the drop model using any different forms of machine learning.

In one embodiment, the drop model is trained with sensor data collected from the mobile terminal 100 of randomly selected users. In another embodiment, the drop model is trained with sensor data collected from the mobile terminal 100 of the specific user of the mobile terminal 100 for which the trained drop model will be utilized. In the latter case, the sensor data collected from the user can be used to form a unique or individualized profile (user profile). The data in the user profile may then be used to train the drop model and/or be compared to previously trained drop models. Previously trained models that match (or are similar) to the user profile data may be selected as a trained model that corresponds to the individualized user profile. A discussion of user profiles is detailed below with reference to FIG. 5.

At 308, after the collected data has been matched (or is found to be similar) to a drop model, a notification is sent to the user of the mobile terminal 100. Such notifications may come in any form or combination of forms, including, but not limited to, an audible notification, a visual notification, a tactile notification, a sensory notification, etc.

In one embodiment, the notification may notify, alert or warn a user of the mobile terminal 100 that a drop event is likely to occur or is imminent. For example, the mobile terminal 100 may sound an audible alarm that indicates the potential for a drop event. The audible alarm may have different levels corresponding to the likelihood of that a drop event is about to occur, or may include a progressive sounding alarm that increases or decreases in volume as the potential for a drop event rises or falls. In another embodiment, the notification may provide feedback to the user of the mobile terminal 100. Feedback may indicate to the user ways in which to improve grip patterns or avoid specific behaviors that typically result in a drop event, either prior to or after a drop event. For example, a message may be displayed on display 102 that instructs the user to grip the mobile terminal 100 with two hands or using a different orientation.

At 310, when the mobile terminal 100 (and/or sensors external to the mobile terminal) a drop event is prevented as a result of the notification provided at 308, feedback may be optionally provided to the user at 312, where the feedback includes, for example, comments or a reward notification. For example, the mobile terminal 100 may provide feedback in recognition of a drop avoidance as a result of the user gripping and/or maintaining the grip of the mobile terminal 100 to prevent a drop event and/or as a result of the user engaging in behavior that is likely to avoid a drop event. For example, a message may be displayed on display 102 that reads "Excellent grip. Keep up the good work!" or be allotted "points" that track a user's grip pattern and/or behavior. In other examples, the mobile terminal 100 may output a noise or vibration indicative of acceptable grip patterns or "positive" behaviors. Use of feedback in this manner encourages, for example, habit forming grip patterns and behaviors such that future drop events are less likely to occur. In one embodiment, the feedback is provided from a component or device external to the mobile terminal 100. For example, external sensors 250 may detect behaviors by the user and report them to the mobile terminal 100.

In one embodiment, feedback is provided to the user on a regularly occurring basis. In one other embodiment, feedback is provided during a predefined event, such as when a user is gripping the mobile terminal 100 in a particular pattern (e.g., a pattern that is likely to result in a drop event or a pattern likely to prevent a drop event) or when the mobile terminal 100 detects motion, such as detected by an accelerometer or GPS.

When a drop event is not avoided (e.g., the user drops the mobile terminal), as determined at 310 by the mobile terminal 100 (and/or sensors external to the mobile terminal), the procedure continues to 307 where the drop models are compared against collected data (e.g., user's grip patterns and behaviors) from the internal sensors 250 and/or external sensors 216 at 306.

In one embodiment, feedback may be optionally provided to the user at 311. Feedback after a drop event has been determined to occur at 310, unlike the feedback at 312, may indicate to the user that various grip patterns and/or "negative" behaviors resulted in the drop event. The feedback may provide helpful tips or suggestions to avoid future drop events. For example, the feedback may provide a message to display 102 of the mobile terminal 100 that states "To avoid drops, consider gripping the mobile device with two hands and avoid carrying other objects."

In one embodiment, the feedback (at 311 or 312) may be tracked over a period of time. The tracked feedback may show or illustrate user habits. For example, the feedback may capture user habits when preparing breakfast in the morning while attempting to read text messages, or the percentage of drop events that occur when the user is watching television versus taking an afternoon jog.

Figure 4:
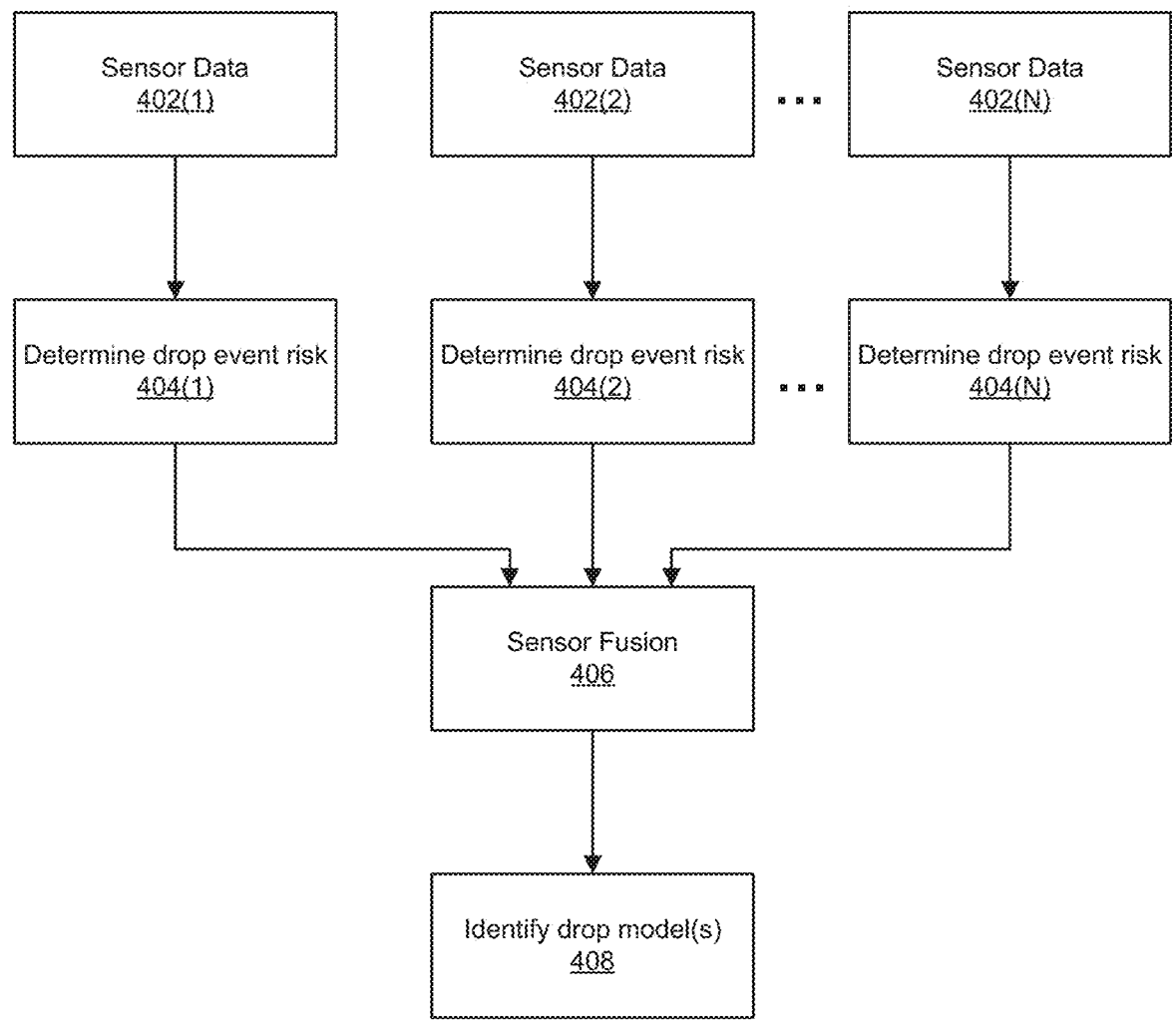
FIG. 4 illustrates a flow diagram for collecting and fusing sensor data in accordance with embodiments of the disclosure.

FIG. 4 illustrates a flow diagram for collecting and fusing sensor data in accordance with embodiments of the disclosure. As described above, internal sensors 250 and/or external sensors 216 collect data from a variety of one or more sensors. Although any number of different types of data may be collected by the sensors, for purposes of the discussion that follows, user grip pattern and behavior data are collected by the sensors as sensor data 402(1)-402(N).

In one example embodiment, sensor data 401(1)-401(N) is collected from the mobile terminal 100 to determine the behavior of the user while the user performs one or more activities while carrying the device. Examples of such one or more activities, include, but are not limited to, taking photos, playing video games, walking, running, jogging, cycling, rowing, driving a car, moving with bus, moving with train, walking stairs, running stairs, jumping, swimming, playing football, and skiing.

The mobile terminal 100 may be tracked, for example, using at least three possible variables—location, motion and/or time, although other variables may be included. Motion activities may include vibration patterns, acceleration patterns, speed and frequency of certain movements. Exemplary motion sensors include the user's mobile terminal's accelerometer, gyroscope, compass, altimeter, changes in WiFi signal strength, changes in the GPS readings, barometric pressure sensor, temperature sensor, microphone sensor, ambient light sensor, Bluetooth chip, NFC sensor, proximity sensor, RGB color sensor, image sensors, humidity sensors, cell-tower signals, biometric sensors, fingerprint sensors, bio-sensors. Additional possible motion sensors include sensing changes in: location, motion, brightness, temperature, environmental sounds, WiFi. Bluetooth, etc., as well as data collected from sensors external to the mobile terminal 100.

Examples of motion patterns that can be tracked include, for example, the speed and pace at which the mobile terminal user normally walks. The speed and pace at which the mobile terminal user normally walks is a unique signal which can be identified by the accelerometer, gyroscope and/or GPS. Another motion pattern includes the "bounce" or "shake" of the mobile device in a person's hand, arm, pocket, bag or purse as they walk or run. The motion as a person reaches for their mobile terminal in a pocket (or purse or briefcase and moves the device to their ear (and the angle they hold the mobile terminal) is a unique pattern, which can be identified by the accelerometer and gyroscope.

Other embodiments include identifying the mode of transportation the person uses, and the transportation pattern (time of day, day of week, time duration) and what they were doing before and after. The time of day, day of week, and time duration at which the person carries out the activities above can be used to help determine and learn user behavior patterns over a period of time, as well as actions likely to result from the activities.

Spatial information (such as, longitude, latitude, altitude) of the user can be determined by a location based sensors, such as a global positioning system (GPS), and/or network-based location, such as location determined by cellular and/or WiFi networks of the mobile terminal 100. Based on the spatial information, a processor (such a sensor processor 230) of the mobile terminal 100 can determine locations of the user.

In one embodiment, images generated by a camera, and/or audio signals received by a microphone of the mobile terminal 100 can be used to provide additional user behavior data. For example, images captured by a camera of the mobile terminal 100 (or a camera remotely positioned in a location of the device) can be used to provide additional user behavior data. For instance, the camera may capture images of signs on a highway proximate to the user's location that can be used to determine the user's behavior. This data may be coupled with, for example, accelerometer data or other sensor data to make an educated decision as to the exact behavior of the user. Similarly, the mobile terminal 100 may capture audio signals sensed by a microphone that can be used to provide additional behavior data. For instance, a loud noise versus a quiet noise in the background of a user's location can be used to aid whether the user is engaging in relatively risk free behavior (studying at library because there is little noise present, coupled with GPS location) or engaging in risky behavior (e.g., loud background noise and words recognized as being associated with a sports team).

In still other embodiments, behavior data may be discerned from sensors collecting data related to direction of the user, for example, by a compass of the mobile terminal 100. Moreover, orientation of the user can be determined, for example, by a gyroscope of the mobile terminal 100. Still other sensors may provide information about ambient temperature. For example, a thermometer of the mobile terminal 100 can provide the temperature of the current environment to determine whether the user is or was outside versus inside. In additional embodiments, exposure to ambient light by the user can be determined, for example, by a light sensor of the mobile terminal 100. For example, sensed levels of infrared radiation (IR) can be used to determine whether the mobile terminal 100 is in the user's pocket or direct sun light. Other example embodiments provide behavior data by collection of user input data, such as information that can be received from an input device, such as a key-board or touch screen. Based on the user provided input, behavior data can be inferred, and therefore, educated guesses can be made regarding the location, time, environment, activities, etc. of the user. For example, if the user is inputting information, the user is probably not driving. If the user is talking, the user is probably not at a movie theater.

In another example embodiment, sensor data 401(1)-401(N) is collected from the mobile terminal 100 to determine the grip or grip pattern of the user while holding the device. A user's grip on the mobile terminal 100 is sensed using any number of different internal sensors 250 in order to recognize a grip pattern. The sensor processor 230 may determine one of a gripped or ungripped state, a grip pattern, and a grip time period by processing data received by at least one of the sensors 250. In this case, the gripped/ungripped state represents whether a user is gripping the mobile terminal 100, and the grip pattern represents a pattern in which a user grips the mobile terminal 100. The grip time period represents a time period for which a user grips the mobile terminal 100.

In one example embodiment, sensors provided on the mobile terminal 100 to determine whether a user is gripping the device may include a touch sensor or pressure sensor. The touch and pressure sensors may detect when contact is made on the mobile terminal 100 by a user holding or gripping the device, which then enables the sensor processor 230 to recognize the grip pattern associated with the particular grip of the device.

The touch sensor may be disposed on at least one side of the mobile terminal 100, for example on the lateral sides, in order to detect a user's touch when the user holds or grips the mobile terminal 100. Similarly, a pressure sensor may be provided to detect pressure applied to the device. The pressure sensor may, like the touch sensor, be disposed on at least one side of the mobile terminal 100. In other embodiments, the touch sensor and the pressure sensor may be disposed in a predetermined area of the mobile terminal 100 such that a user's grip can be easily detected. For example, sides of the mobile terminal 100 may form a grip area, where the touch sensor and the pressure sensor are disposed such that a user's grip can be easily detected. Other areas may include the entirety or portions of the display or screen of the device, the back side of the device, etc.

In one embodiment, in addition to internal sensors 250, sensors may be placed in a surrounding environment in which the mobile terminal 100 is located (or will be located). The sensors may be used in place of those residing in the mobile terminal 100 or supplemental to those in the mobile terminal 100, such as the aforementioned external sensors 216. Sensors could be remote from the mobile terminal 100, such as wearable sensors, and in communication with the device via NFC, BacNet, ANT+, Bluetooth, all IEEE 802.15, or other known techniques. External machine vibration, acoustics, thermals, and other diagnostic data may also be collected in addition to the data collected from the internal sensors 250.

Example grip patterns will be discussed further below with reference to FIGS. 6A-6D.

As sensor data 402(1)-402(N) is collected from individual sensors, the data is respectively analyzed to determine the drop event risk (or level of risk) 404(1)-404(N). The mobile terminal 100 has the ability to reliably detect and predict a drop event based on the collected sensor data 402(1)-402 (N), which includes at least one of grip pattern and behavior data of the user of the mobile terminal 100. In one embodiment, the mobile terminal 100 determines that a drop event has been prevented as a result of the analysis and subsequent notification to the user. In another embodiment, the mobile terminal 100 detects that a drop event has occurred despite notification to the user.

Analysis of the sensor data 402(1)-402(N) may be performed by the mobile terminal 100 in one embodiment, or the sensor data 402(1)-402(N) may be offloaded to another device, such as another mobile terminal or server in the cloud, in another embodiment. For purposes of discussion, and in the examples provided herein, the analysis is performed by the mobile terminal 100 unless otherwise stated.

To detect and predict the potential drop event risk of the mobile terminal 100, the sensor processor 230 receives the sensor data 402(1)-402(N) for comparison to predefined values (or a range of values) of a corresponding type or category (classification) of data. For example, sensors that detect acceleration may be categorized as "acceleration data" since the sensors collect acceleration measurements. The collected acceleration data may be compared to predefined acceleration values to determine the state of the mobile terminal 100. For example, acceleration data may be stored in a table in which value ranges correspond to speed and the speed ranges correspond to a risk level and likelihood that a drop event will occur. Table I below illustrates such an example. It is appreciated that the values, risk level and likelihood of a drop event are intended to be a non-limiting example.

TABLE I

| Range of Speed (in mph) | Risk Level | Likelihood of drop event |
| --- | --- | --- |
| 0-2 | Low | 2% |
| 3-5 | Medium | 4% |
| 6-10 | High | 10% |
| 11-50 | Very high | 25% |
| >50 | Extremely high | 75% |

In another example, sensors that detect grip may be categorized as "grip data" since the sensors collect grip measurements. The collected grip data may be compared to predefined grip patterns to determine the stability of the user grip on the mobile terminal 100. For example, predefined grip patterns (example depictions of which are described with reference to FIGS. 6A-6D below) may be stored in a table in which different grip patterns correspond to different risk levels and a likelihood that a drop event will occur. Table II below illustrates an example. It is appreciated that the grip pattern, risk level and likelihood of a drop event are intended to be a non-limiting example.

| Grip Pattern | Risk Level | Likelihood of drop event |
| --- | --- | --- |
| (1) right hand, user's thumb contacts the left lateral side of the mobile terminal, and the user's middle, ring, index and pinky fingers contact the right lateral side of the mobile terminal. Mobile terminal in portrait position. | High | 30% |
| (1) right hand, user's thumb contacts the left lateral side of the mobile terminal, and the user's middle, ring, and index and pinky fingers contact the right lateral side of the mobile terminal and (2) left hand, user's thumb contacts display and the user's middle, ring, index and pinky fingers contact the back side of the mobile terminal. Mobile terminal in landscape position. | Medium | 15% |
| (1) left hand, user's thumb contacts the display of the mobile terminal, and the user's middle, ring, and index and pinky fingers contact the back side of the mobile terminal and (2) right hand, user's thumb contacts the display of the mobile terminal, and the user's middle, ring, and index and pinky fingers contact the back side of the mobile terminal. Mobile in landscape position. | Low | 5% |

In one other embodiment, the mobile terminal 100 may optionally identify whether the user is also holding or gripping additional or extra objects. Holding or gripping other objects may affect the user's grip pattern and/or stability of the grip so as to increase or decrease the likelihood of a drop event and corresponding risk level. For example, if the mobile terminal 100 recognizes that the user is holding a wristlet that is tied to a case of the mobile terminal 100, then the likelihood of a drop event (and the risk level of a drop event occurring) may decrease. Whereas, if the mobile terminal 100 detects that the user is holding a bag in the same hand as the mobile terminal 100, then the likelihood of a drop event (and the risk level of a drop event occurring) will increase. Recognition of such additional or extra objects in the user's hand(s) may be detected, for example, using the same sensors that perform the aforementioned grip and behavior detection.

In the examples described above, the predefined data is stored in a table format. However, it is appreciated that the data may be stored in any number of different formats as readily appreciated by the skilled artisan. Moreover, any number of different sensors may be employed to collected sensor data. Each of the collected sensor data may be associated with a risk level that a drop event will occur, along with a percentage associated with the likelihood of a drop event.

Once the drop event risk is determined for each of the sensor data 402(1)-402(N), the collective data may be fused or aggregated at 406. Sensor fusion engine 244 (FIG. 2) performs the actual fusion of sensor data 402(1)-402(N). The data fusion engine 244 may, for example, employ a stochastic model for performing the data fusion. Different stochastic models can be used for performing data fusion, including, for example, Hidden Markov Models (HMM), Bayesian Networks, and Neural Networks.

Prior to operation of the data fusion engine 244, the data fusion engine 244 is trained to establish the parameters of the HMM(s). One example of a method for training an HMM to establish the parameters of the HMM is described in detail in L. Rabiner, "*A Tutorial on Hidden Markov Models and Selected Applications in Speech Recognition*", *Proc. of IEEE*, vol. 77, no. 2, February 1989. Once the training is complete, the data fusion engine 242 is may be employed to receive the sensor data 402(1)-402(N) and perform data fusion. Accordingly, at 406, the data fusion engine 244 receives the sensor data 402(1)-402(N) from one or more of the internal data sensors 250 and/or external data sensors 216, fuses the data, and updates the parameters of the model during operation as necessary.

At 408, the mobile terminal 100 then identifies a drop model(s) corresponding to the fused data in accordance with the procedures described above.

Figure 5:
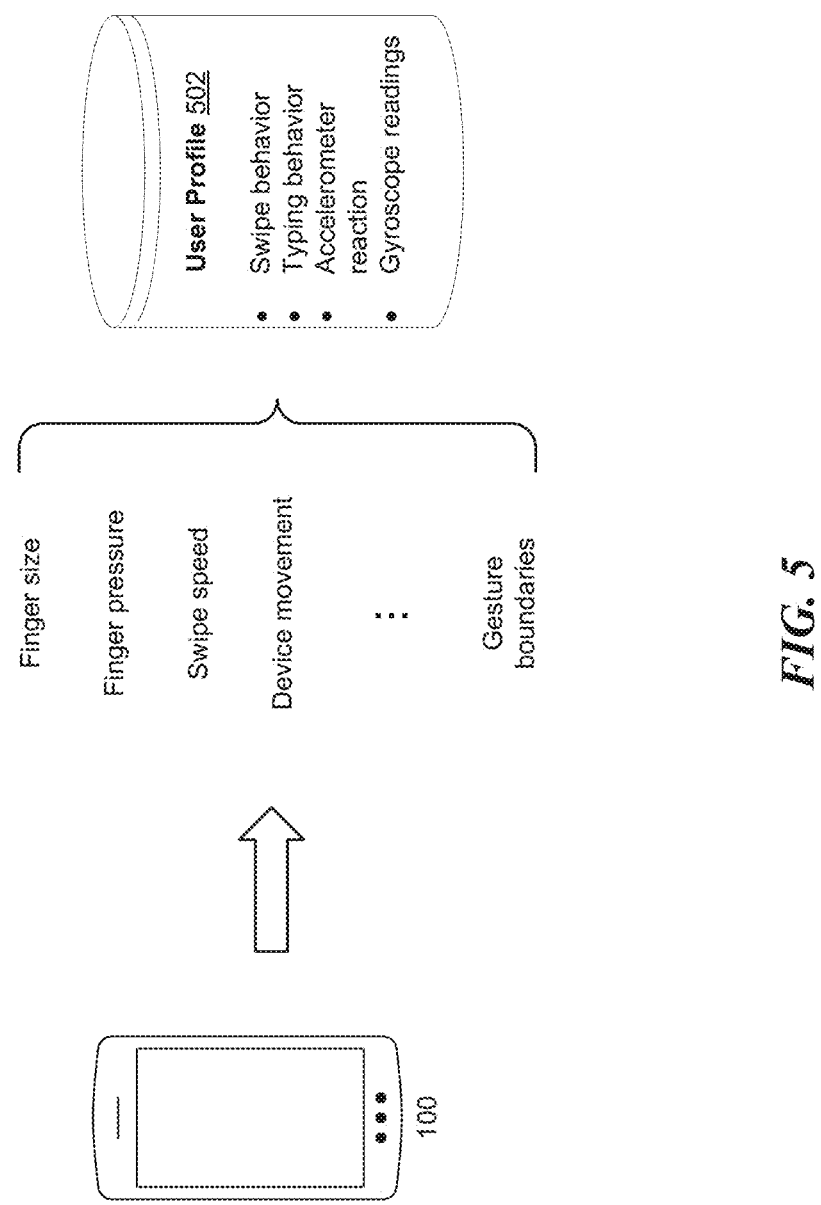
FIG. 5 illustrates an example of a user profile in accordance with the disclosed embodiments.

FIG. 5 illustrates an example of a user profile in accordance with the disclosed embodiments. Data collected form internal sensors 250 and/or external sensors 216 of the mobile terminal 100 (as detailed above with reference to FIGS. 3 and 4) may be used to generate a user profile 502.

As noted above, the internal sensors 250 and external sensors 216 of the mobile terminal 100 may be employed to detect and monitor movements or activities carried out by the user. Such movements may include, for example, an orientation and/or angle at which a user holds the mobile terminal 100 during operation thereof. For example, a particular user may typically hold the mobile terminal 100 at a horizontal, landscape orientation, with the display tilted at a 45 degree angle with respect to the ground. Such behavior, especially when consistently exhibited, may be stored and associated with the user profile 502 pertaining to the particular user. As such, when similar behavior is recognized, the mobile terminal will be able to associate the particular user of the device with the recognized behavioral pattern and more readily identify drop models that are relevant to the individual user.

Examples of other behaviors that assist in generating a user profile 502 include, but are not limited to, detecting and monitoring finger size, finger pressure, swipe speed, device movement, gesture boundaries, etc. For example, a fingerprint sensor that is employed in the mobile terminal 100 may be monitored for behavioral data. Any one or more of the pressure, the center of pressure, the position of the finger of the user, and the relative motion of the finger when using a fingerprint sensor may indicate that the particular user is likely to cause or prevent a drop event. For example, if a particular user always applies significant pressure when using the fingerprint sensor without causing a drop event, such behavior may be stored in the user's profile and may be a recognizable pattern indicative of the particular user's likelihood of causing a drop event (in this case, the risk level would be lower).

As a further example, if a particular user always swipes his finger over the fingerprint sensor from the upper left to the lower right, such behavior may be stored in the user's profile and may be a recognizable pattern indicative of the particular user's risk level of causing a drop event. In another example, if a particular user always holds his mobile terminal 100 with a 45 degree angle relative to the ground when swiping his finger over the fingerprint sensor, such behavior may be stored in the user's profile and may be a recognizable pattern indicative of the particular user.

In yet another example, the reaction of a particular user to an acceleration event may be stored in the user's profile and may be a recognizable pattern indicative of the particular user's risk level of causing a drop event. For example, if a particular user exhibits behavior of gripping the mobile terminal 100 with two hands when an acceleration event occurs, the risk level for causing a drop event will decrease. Likewise, if the particular user exhibits behavior of fumbling the mobile terminal 100 when an acceleration event occurs, the risk level for causing a drop event will increase.

It is appreciated that any different number and type of sensor data may be monitored and stored for a user profile and that the examples provided above are non-limiting.

FIGS. 6A-6D illustrate various grip patterns of a user gripping a mobile terminal. When the mobile terminal 100 determines that a grip is sensed, the grip pattern of the user holding the mobile terminal 100 is detected.

Figure 6A:
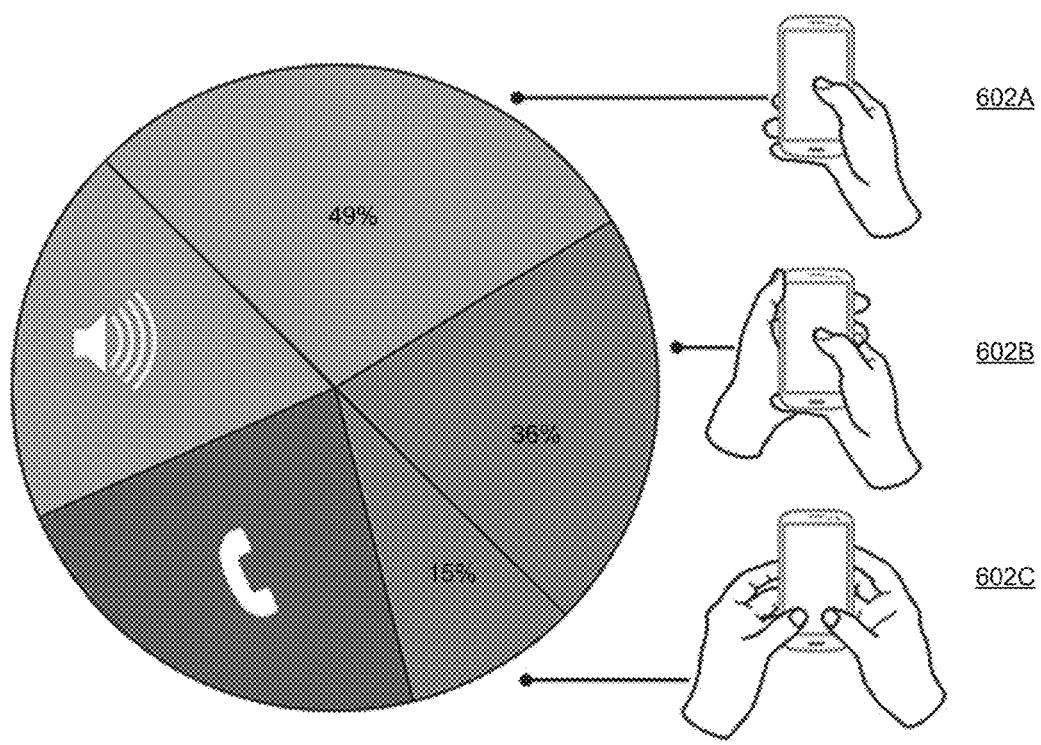
FIGS. 6A-6D illustrate various grip patterns of a user gripping a mobile terminal.

FIG. 6A shows three scenarios of users touching the display screen of the mobile terminal 100 while using different grip patterns. For example, grip pattern 602A illustrates the user gripping the mobile terminal 100 with one hand (which occurs in 49% of users), grip pattern 602B illustrates the user gripping the mobile terminal 100 in a cradled manner (which occurs in 36% of users), and grip pattern 602C illustrates the user gripping the mobile terminal 100 with two hands (which occurs in 15% of users). As explained above, different gripping patterns will result in different risk levels that a drop event will occur.

Figure 6B:
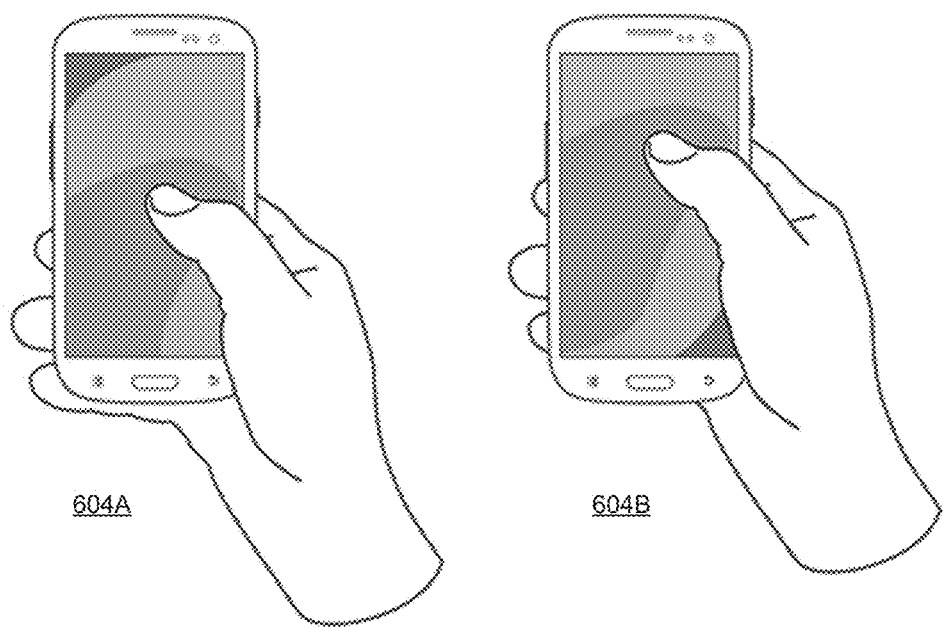

With reference to FIG. 6B, a grip pattern is formed when a user holds (grips) the mobile terminal 100 with her right hand. When the user has gripped the mobile terminal 100 with her right hand, the user's thumb contacts the display of the mobile terminal 100, and the user's middle, ring, index and pinky fingers contact the left lateral side of the mobile terminal 100 so that a grip pattern can be determined according to the user's contact fingers. As illustrated, the contact fingers position in grip 604A slightly differs from the contact fingers position in grip 604A. Depending on acquired sensor data, such as sensor data 402(1)-402(N), the varying position of the user's contact fingers may result in varying risk levels that a drop event may occur. In one embodiment, any contact with the user's palm and/or wrist, which may be sensed by the mobile terminal 100 sensors, may also determine the user's grip pattern as well as affect the resulting risk level that drop event will occur.

Figure 6C:
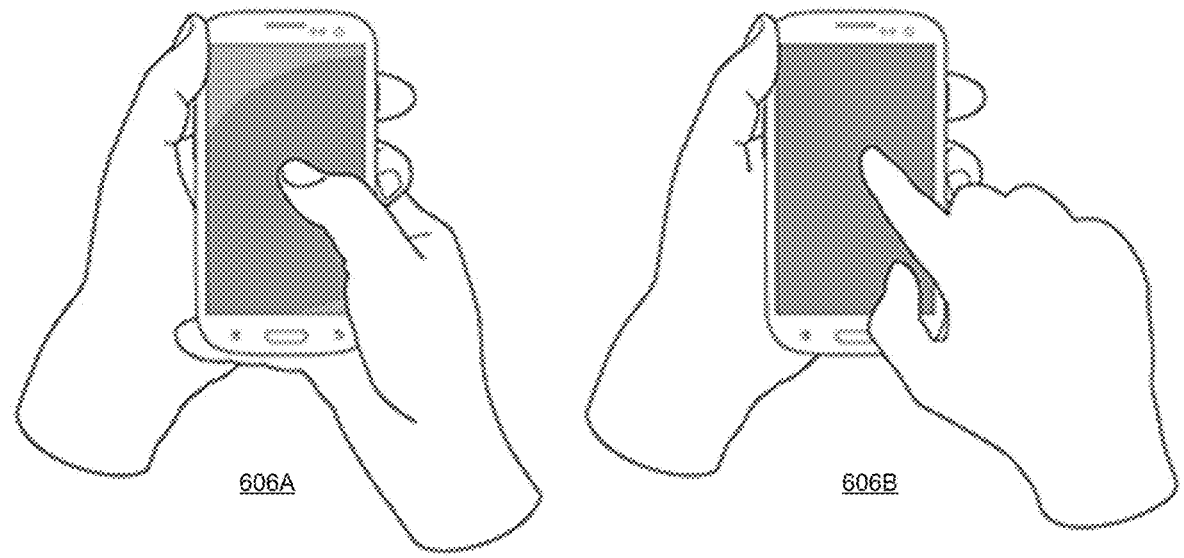
Figure 6D:
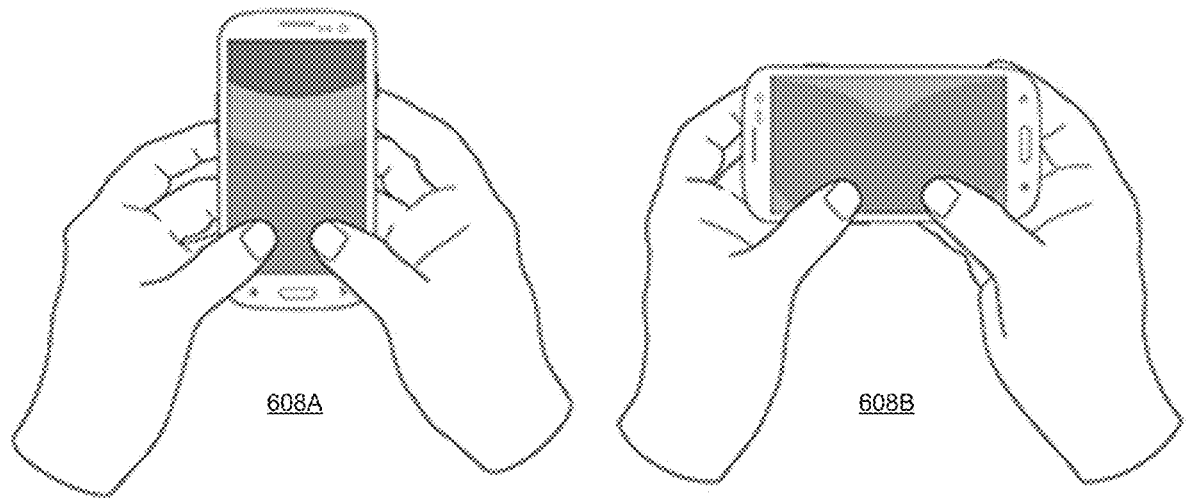

FIGS. 6C and 6D illustrate additional embodiments of a user's grip pattern on the mobile terminal. With reference to FIG. 6C, a grip pattern 606A is formed when a user holds (grips) the mobile terminal 100 with her right hand and additionally cradles the mobile terminal with her left hand. When the user has gripped the mobile terminal 100 with her right hand, the user's thumb contacts the display of the mobile terminal 100, and the user's middle, ring, index and pinky fingers contact the left lateral side of the mobile terminal 100 so that a grip pattern can be determined according to the user's contact fingers. As illustrated, the grip pattern 606B differs from the grip pattern 606A in that the user's right hand no longer grips the mobile terminal 100. Rather, the user's left hand grips the mobile terminal 100, while the user's right index finger contacts the display screen. Similar to the examples above, depending on the acquired sensor data, such as sensor data 402(1)-402(N), the varying grip patterns 606A and 606B may result in varying risk levels that a drop event may occur.

Turning to FIG. 6D, a grip pattern 608A is formed when a user holds (grips) the mobile terminal 100 with contact fingers from her left and right hands. As illustrated, the user's thumbs contact the display of the mobile terminal 100, and the user's middle, ring, index and pinky fingers contact the left and right back side of the mobile terminal 100 to thereby form the grip pattern. As illustrated, the grip pattern 608B differs from the grip pattern 606A in that the mobile terminal 100 orientation is rotated horizontally as opposed to vertically. Similar to the examples above, depending on the acquired sensor data, such as sensor data 402(1)-402(N), the varying grip patterns 608A and 608B (in this case, as a result of the mobile terminal orientation) may result in varying risk levels that a drop event may occur.

Figure 6E:
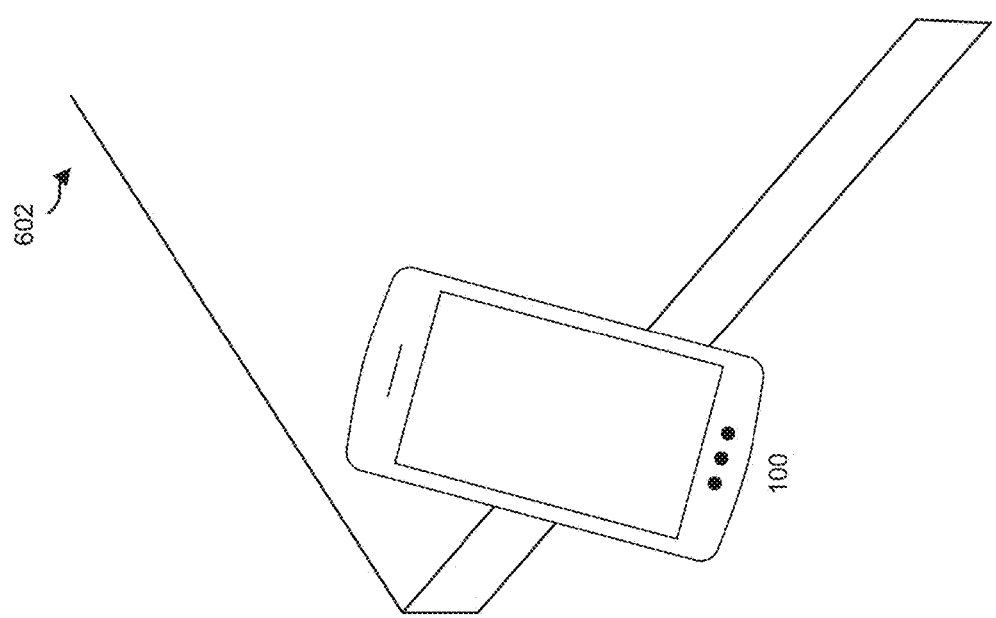
FIG. 6E illustrates an example placement pattern of a mobile terminal.

FIG. 6E illustrates an example placement pattern of a mobile terminal. In the embodiments discussed above, patterns have been described with reference to a user's grip on the mobile terminal 100. However, the sensors (internal sensors 250 and/or external sensors 216) may also detect placement patterns of the mobile terminal 100. For example, in the depicted embodiment, the mobile terminal has been placed on the edge of a table or countertop 602. Placement of the mobile terminal 100 upon an object, such as table or countertop 602, may be detected using any of the aforementioned sensors 250 and/or 216. Any number of additional sensors, such as an ultra-sound sensor, an infrared (IR) sensor, an RGB camera, a time of flight (TOF) camera, a structure light module sensor, a light detection and ranging (LIDAR) sensor, etc., may also be used to determine the surrounding object or structure and placement of the mobile terminal 100 thereon.

Similar to the procedures above in which a potential drop event may be detected and a user notified of the potential or risk level of such drop event, placement of a mobile terminal 100 on an object may also increase the risk level of a potential drop event occurring. Thus, when a placement pattern is detected that indicates the likelihood of a drop event, a user will be notified of the likely occurrence in an attempt to prevent such a drop event. For example, a camera on the mobile terminal 100 analyzes the surrounding area by generating grayscale or RGB color images. Image processing may then be performed on the captured grayscale or color images to determine the location and orientation of the mobile terminal 100 placed on the object and whether the mobile terminal 100 is safe from a drop event. If processed sensor data indicates that a drop event is likely to occur, a notification will be sent to the user, similar to the processes described above. Notification may be sent to the user via any of the techniques described above, including sounding of an alarm or flashing of a light. In one additional embodiment, the notification is sent to another user device, such as a watch being worn by the same user.

It is appreciated that detection of a placement pattern is not limited to table or countertop 602, and that any other surface upon which a mobile terminal 100 may be placed, such as a car dock, bike mount, nightstand, etc., may also be recognized by the sensors.

Figure 7:
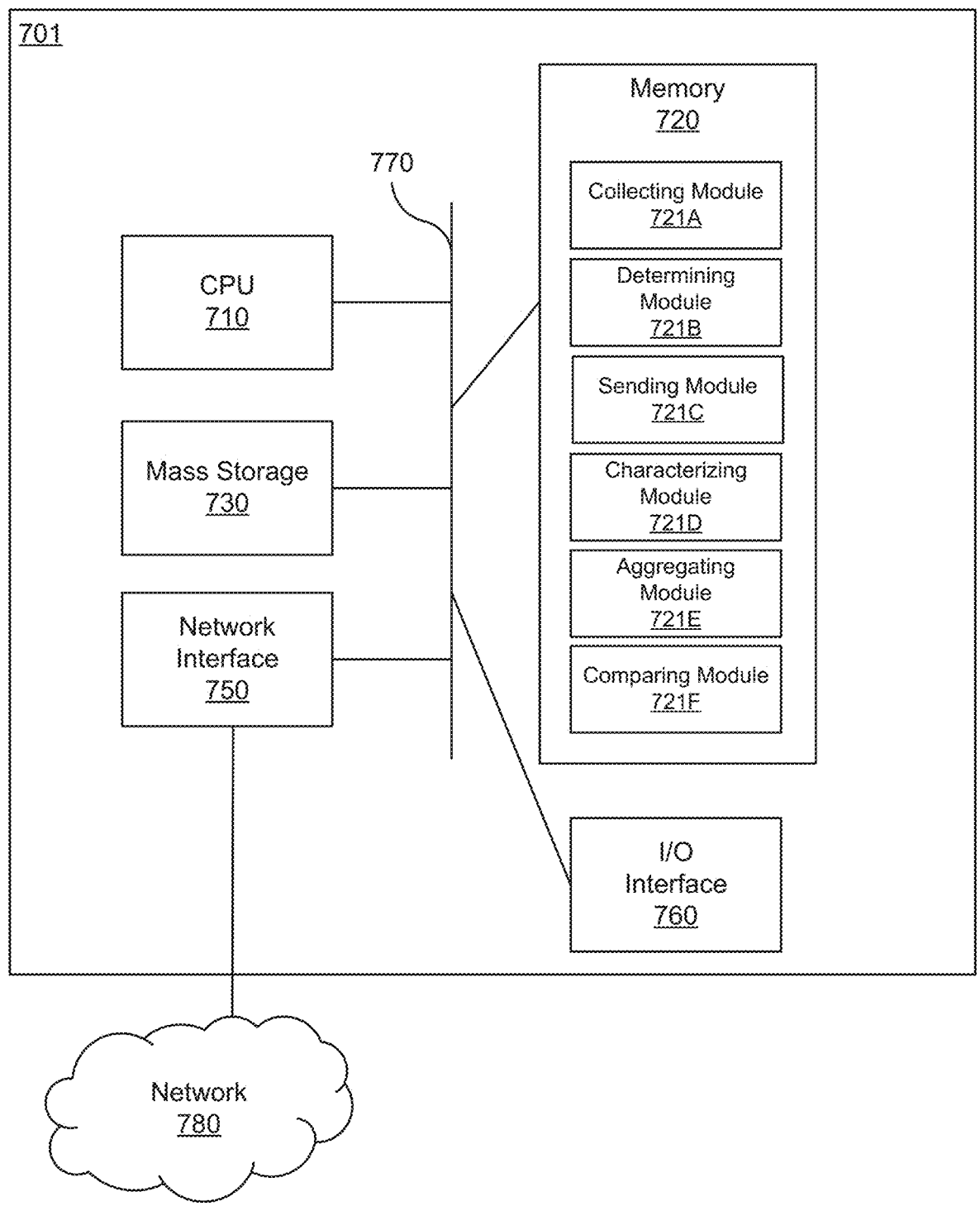
FIG. 7 illustrates a block diagram of a network system that can be used to implement various embodiments.

FIG. 7 is a block diagram of a network device that can be used to implement various embodiments. Specific network devices may utilize all of the components shown, or only a subset of the components, and levels of integration may vary from device to device. Furthermore, the network device 700 may contain multiple instances of a component, such as multiple processing units, processors, memories, transmitters, receivers, etc. The network device 700 may comprise a processing unit 701 equipped with one or more input/output devices, such as network interfaces, storage interfaces, and the like. The processing unit 701 may include a central processing unit (CPU) 710, a memory 720, a mass storage device 730, and an I/O interface 760 connected to a bus 770. The bus 770 may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. In one embodiment, the memory 720 includes a collecting module 721A collecting sensor data from the mobile device using one or more sensors to determine a grip pattern and current behavior of a user, a determining module 721B determining a potential drop event risk of the mobile device based on the grip pattern and the current behavior of the user, a sending module 721C sending a notification to the user of the mobile device indicating the potential drop risk when the grip pattern and the current behavior of the user is determined to satisfy a threshold risk level, a characterizing module 721D characterizing the sensor data from each of the one or more sensors to determine a level of risk of the drop event, an aggregating module 721E aggregating the sensor data to construct a behavior drop event risk model using machine learning, and a comparing module 721F comparing the grip pattern and current behavior of the user to the behavior drop event risk model to determine the potential drop event risk.

The mass storage device 730 may comprise any type of storage device configured to store data, programs, and other information and to make the data, programs, and other information accessible via the bus 770. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of preventing a drop event for a mobile device, comprising:
    collecting sensor data from the mobile device using one or more sensors to determine at least one of a pattern and current behavior of a user;
    determining a potential drop event risk of the mobile device based on at least one of the pattern and the current behavior of the user, the determining including analysis of at least one of a placement pattern, user hand grip area, user hand grip force, phone shake and user grip center to center of gravity of the mobile device;
    sending a notification to the user of the mobile device indicating the potential drop risk when at least one of the pattern and the current behavior of the user is determined to satisfy a threshold risk level; and
    sending positive feedback to the user to encourage learned behavior to prevent future drop events in response to the notification preventing the drop event.

2. The method of claim 1, further comprising:
    characterizing the sensor data from each of the one or more sensors to determine a level of risk of the drop event;
    aggregating the sensor data to construct a behavior drop event risk model using machine learning; and
    comparing at least one of the pattern and current behavior of the user to the behavior drop event risk model to determine the potential drop event risk.

3. The method of claim 2, further comprising identifying user patterns to generate the behavior drop event risk model, the patterns generated by
    collecting the sensor data when a drop event occurs;
    collecting the sensor data when detecting the potential drop event risk prior to occurrence of the drop event; and
    correlating the sensor data when the drop event occurs with the sensor data of the potential drop event risk.

4. The method of claim 3, further comprising constructing a user-specific behavior profile based on the user patterns.

5. The method of claim 4, wherein the pattern is a grip pattern and the constructing further comprises:
    determining the pattern of the user on the mobile device;
    determining a stability of the pattern on the mobile device; and
    identifying the potential drop event risk for each pattern.

6. The method of claim 5, further comprising:
identifying additional objects in the user grip; and
combining the pattern of the user on the mobile device with the user grip of the additional objects to identify an overall risk of the drop event.

7. The method of claim 1, wherein sending the notification includes at least one of a visual notification, an auditory notification and a vibration notification.

8. The method of claim 1, wherein the determining is an analysis of a placement pattern of the mobile device.

9. The method of claim 1, wherein the determining is an analysis of a user hand grip area.

10. The method of claim 1, wherein the determining is an analysis of a user hand grip force.

11. The method of claim 1, wherein the determining is an analysis of a phone shake and user grip center to center of gravity of the mobile device.

12. A mobile device for preventing a drop event, comprising:
a non-transitory memory storage storing instructions;
one or more sensors collecting sensor data from the mobile device to determine at least one of a pattern and current behavior of a user;
one or more processors in communication with the memory, the one or more processors executing the instructions to determine a potential drop event risk of the mobile device based on at least one of the pattern and the current behavior of the user, the determining including analysis of at least one of a placement pattern, user hand grip area, user hand grip force, phone shake and user grip center to center of gravity of the mobile device;
a notifier providing a notification to the user of the mobile device indicating the potential drop risk when at least one of the pattern and the current behavior of the user is determined to satisfy a threshold risk level; and
the notifier sending positive feedback to the user to encourage learned behavior to prevent future drop events in response to the notification preventing the drop event based on an instruction from the one or more processors.

13. The mobile device of claim 12, wherein the one or more processors further execute the instructions to:
characterize the sensor data from each of the one or more sensors to determine a level of risk of the drop event;
aggregate the sensor data to construct a behavior drop event risk model using machine learning; and
compare at least one of the pattern and current behavior of the user to the behavior drop event risk model to determine the potential drop event risk.

14. The mobile device of claim 13, wherein the one or more processors further execute the instructions to identify user patterns to generate the behavior drop event risk model, the patterns generated by
collecting the sensor data when a drop event occurs;
collecting the sensor data when detecting the potential drop event risk prior to occurrence of the drop event; and
correlating the sensor data when the drop event occurs with the sensor data of the potential drop event risk.

15. The mobile device of claim 14, wherein the one or more processors further execute the instructions to construct a user-specific behavior profile based on the user patterns.

16. The mobile device of claim 15, wherein the pattern is a grip pattern and the constructing further comprises:
determining the pattern of the user on the mobile device;
determining a stability of the pattern on the mobile device; and
identifying the potential drop event risk for each pattern.

17. The mobile device of claim 16, wherein the one or more processors further execute the instructions to:
identify additional objects in the user grip; and
combine the pattern of the user on the mobile device with the user grip of the additional objects to identify an overall risk of the drop event.

18. A non-transitory computer-readable medium storing computer instructions for preventing a drop event for a mobile device, that when executed by one or more processors, cause the one or more processors to perform the steps of:
collecting sensor data from the mobile device using one or more sensors to determine at least one of pattern and current behavior of a user, the sensor data classified into categories for comparison to predefined values of a corresponding type of category of data;
determining a potential drop event risk of the mobile device based on at least one of the pattern and the current behavior of the user, the determining including analysis of at least one of a placement pattern, user hand grip area, user hand grip force, phone shake and user grip center to center of gravity of the mobile device; and
sending a notification to the user of the mobile device indicating the potential drop risk when at least one of the pattern and the current behavior of the user is determined to satisfy a threshold risk level.

19. The non-transitory computer-readable medium of claim 18, further causing the one or more processors to perform the steps of:
characterizing the sensor data from each of the one or more sensors to determine a level of risk of the drop event;
aggregating the sensor data to construct a behavior drop event risk model using machine learning; and
comparing at least one of the pattern and current behavior of the user to the behavior drop event risk model to determine the potential drop event risk.

20. The non-transitory computer-readable medium of claim 19, further causing the one or more processors to perform the step of identifying user patterns to generate the behavior drop event risk model, the patterns generated by
collecting the sensor data when a drop event occurs
collecting the sensor data when detecting the potential drop event risk prior to occurrence of the drop event; and
correlating the sensor data when the drop event occurs with the sensor data of the potential drop event risk.

* * * * *